J. MENSIK.
SPRING WHEEL.
APPLICATION FILED JULY 24, 1915.
1,177,203.
Patented Mar. 28, 1916.
2 SHEETS—SHEET 1.
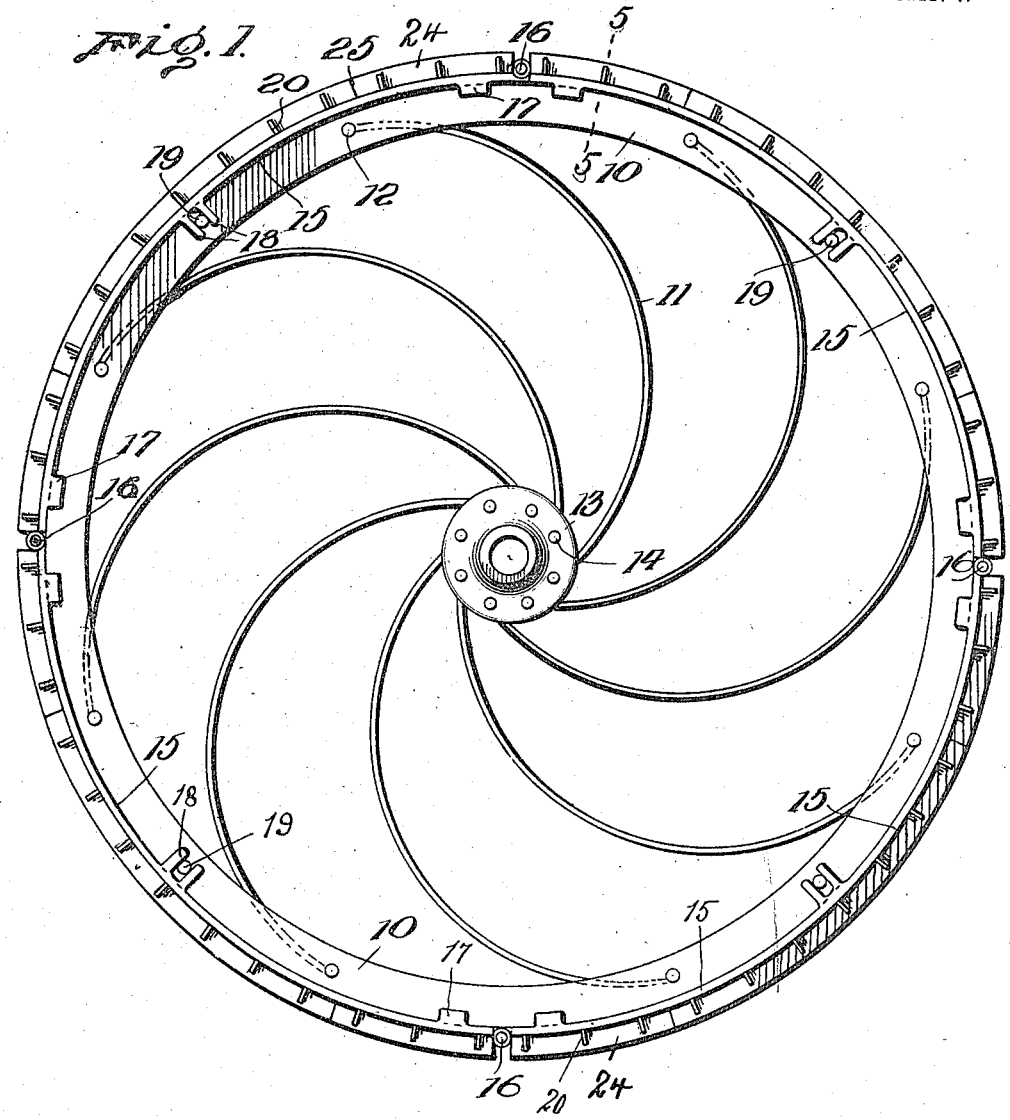
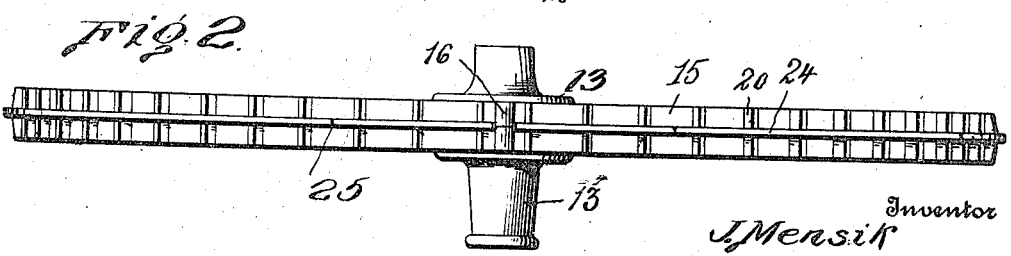
Inventor
J. Mensik

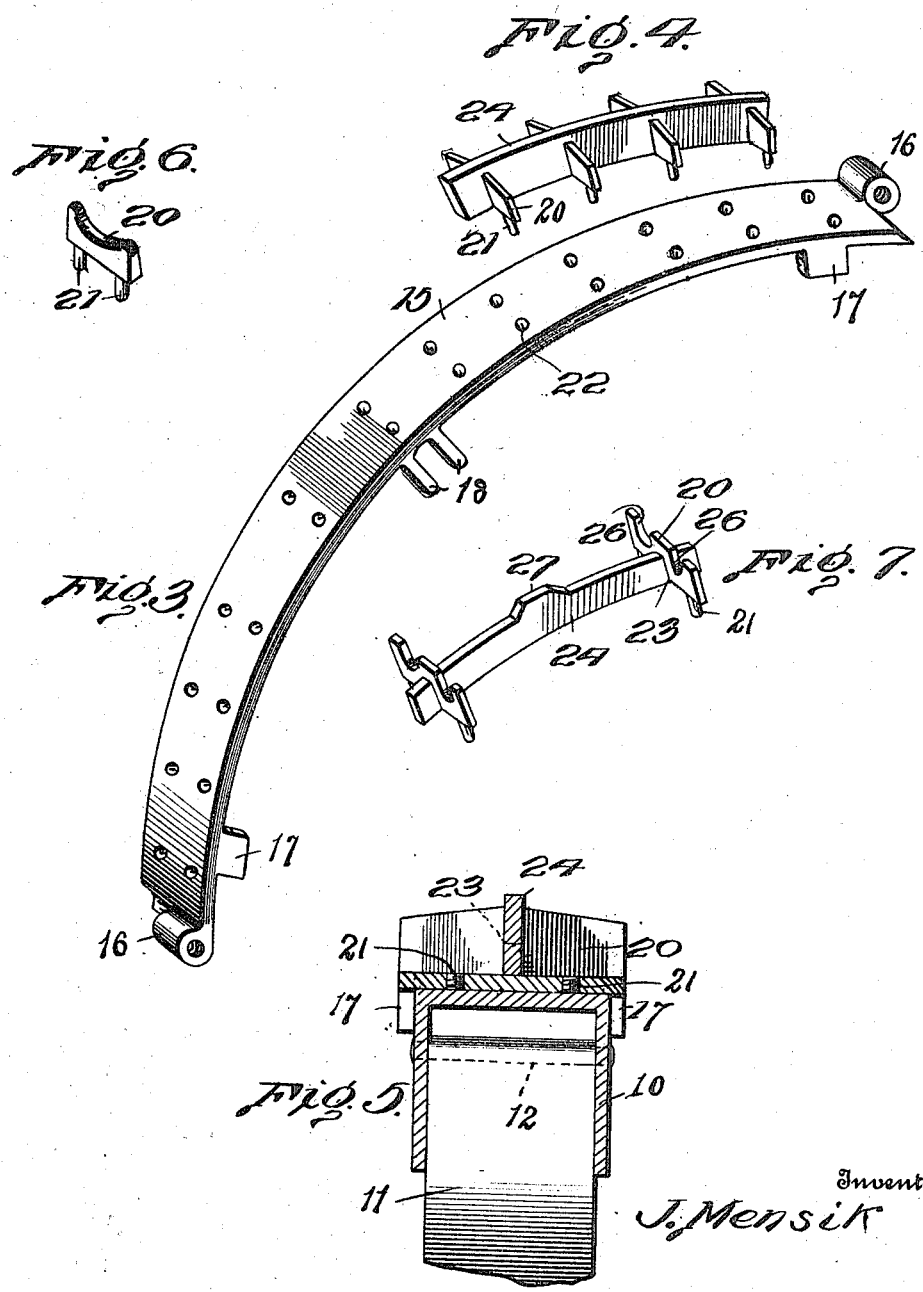

UNITED STATES PATENT OFFICE.

JOSEPH MENSIK, OF LYRA, TEXAS.

SPRING-WHEEL.

1,177,203.

Specification of Letters Patent.

Patented Mar. 28, 1916.

Application filed July 24, 1915. Serial No. 41,715

*To all whom it may concern:*

Be it known that I, JOSEPH MENSIK, a citizen of the United States, residing at Lyra, in the county of Palo Pinto and State of Texas, have invented certain new and useful Improvements in Spring-Wheels, of which the following is a specification.

This invention relates to improvements in wheels and attachments therefor to prevent the wheel from "skidding" or slipping upon muddy or soft roads, and has for one of its objects to provide a simply constructed device which may be applied without material structural change to wheels of various forms and sizes, and to wheels employed under various forms of vehicles.

With these and other objects in view, the invention consists in certain novel features of construction as hereinafter shown and described and then specifically pointed out in the claims; and in the drawings illustrative of the preferred embodiment of the invention—

Figure 1 is a side elevation of a wheel with the improvement applied; Fig. 2 is a plan view of the parts shown in Fig. 1; Fig. 3 is an enlarged perspective view of the base portion of the improved attachment; Fig. 4 is a detached perspective view of one of the anti-slipping or anti-skidding attachments; Fig. 5 is a transverse section enlarged, on the line 5—5 of Fig. 1; Fig. 6 is a perspective view of a modified form of one of the creeper attachments; Fig. 7 is an enlarged perspective view, illustrating a modified construction of one of the anti-skidding or anti-slipping attachments.

Corresponding and like parts are referred to in the following description and indicated in all the views of the drawings by the same reference characters.

The improved device may be applied without material structural change to wheel fellies or rims of various forms, and it is not desired therefore to limit the invention to any particular form of wheel or its felly, but for the purpose of illustration the device is shown applied to a wheel having an annular channel shaped rim 10 constructed as illustrated in Fig. 5 and with curved resilient spokes 11 united by bolts 12 to the rim 10 and to a hub 13 by bolts 14.

The anti-skidding attachment comprises a plurality of segmental base members 15 hingedly united at 16 at their confronting ends, the curvature of the members 15 corresponding to the curvature of the outer face of the rim 10 and bearing closely upon the same, as shown in Fig. 1. Any required number of segmental members 15 may be employed, but generally four will be used, as shown. Preferably, all but one of the pivot members 16 will be rivets and one of the members 16 will be in the form of a threaded bolt, so that the united members 15 may be readily attached to or detached from the felly.

Each of the members 15 is provided with a plurality of stop lugs 17 which bear upon opposite sides of the felly 10, preferably near the ends of the members 15, as shown, and thus effectually prevent lateral displacement of the segmental members. Centrally of each of the segmental members stop lugs 18, spaced apart, are formed and bear upon opposite sides of the felly 10 and likewise embrace transverse stop pins 19, projecting from the felly member 10. By this means, the united segmental members 15 are effectually prevented from movement circumferentially of the wheel felly.

Rigidly connected to the outer faces of the segmental members 15 are transverse ribs 20 spaced at uniform distances apart and preferably each provided with studs 21 which extend through suitable apertures, indicated at 22 in Fig. 3, and are riveted to the members 15 from the inner faces thereof. Each of the ribs 20 is provided with a central outwardly opening recess, indicated at 23, the recesses thus being arranged in alinement circumferentially of the wheel. Fitting in the recesses 23 are a plurality of longitudinally directed ribs 24, the latter being preferably formed in a plurality of sections with their confronting ends in contact, as represented at 25 in Fig. 1. If preferred, the longitudinal ribs 24 may be continuous upon the outer faces of the segmental members 15.

By this simple arrangement a non-skidding or non-slipping sheathing or supplemental rim is produced which may be readily applied to wheels of various forms and sizes and to wheels employed for various purposes and without the necessity of making material changes in the wheels or their fellies. In some forms of wheels, the transverse ribs 20 may be in the form shown in Fig. 6, in which case the longitudinal ribs 24 are dispensed with.

In Fig. 7, a slight modification in the construction is shown consisting in forming each of the transverse ribs 20 with outwardly opening recesses 26 at each side of the center and forming the recess 23 in the lower edge of the transverse rib instead of the upper edge, as shown in Fig. 5, and engaging the longitudinally directed rib 24 in the recesses. In the modified structure shown in Fig. 7, the rib 24 is of less height than that shown in Fig. 4 and with a central projection 27. These various modifications do not constitute a departure from the principle of the invention as the operation and the results produced are substantially the same in all modifications illustrated.

Having thus described the invention, what is claimed as new is:

1. An attachment for wheels comprising a plurality of segmental supports adapted to bear around a wheel felly and having stop lugs near the ends bearing upon each edge of the felly and stops spaced apart intermediate the ends, and pins engaging between said spaced stops and adapted to be inserted in said felly and coöperating with the spaced stops to prevent the supports from moving circumferentially of the wheel.

2. In a device of the class described, a plurality of segments adapted to encompass a wheel, a plurality of grip members spaced apart and secured to the segments transversely thereof, each of said grip members having a recess in its outer edge, and a plurality of segmental members having recesses in their lower edges adapted to coact with the recesses of the grip members.

3. An attachment for wheels comprising a plurality of segmental members adapted to bear around a wheel, an outwardly directed longitudinal rib bearing upon each of said segmental members, and a plurality of transverse ribs spaced apart and secured to said segmental members and crossing the longitudinal rib, said ribs having interlocking recesses where they cross each other.

In testimony whereof I affix my signature in presence of two witnesses.

JOSEPH MENSIK. [L. S.]

Witnesses:
 ALVIN VAJA,
 ALBERT MENSIK.

Copies of this patent may be obtained for five cents each, by addressing the "Commissioner of Patents, Washington, D. C."